United States Patent
Wakimoto

(10) Patent No.: US 10,775,911 B2
(45) Date of Patent: Sep. 15, 2020

(54) OPERATION DEVICE, POSITION DETECTION SYSTEM, AND METHOD FOR CONTROLLING OPERATION DEVICE

(71) Applicant: SEIKO EPSON CORPORATION, Tokyo (JP)

(72) Inventor: Shingo Wakimoto, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/407,239

(22) Filed: May 9, 2019

(65) Prior Publication Data
US 2019/0346942 A1 Nov. 14, 2019

(30) Foreign Application Priority Data
May 10, 2018 (JP) ................................. 2018-091409

(51) Int. Cl.
*G06F 3/038* (2013.01)
*G02B 27/20* (2006.01)
*H04N 9/31* (2006.01)

(52) U.S. Cl.
CPC ........... *G06F 3/0386* (2013.01); *G02B 27/20* (2013.01); *G06F 3/0383* (2013.01); *H04N 9/3194* (2013.01)

(58) Field of Classification Search
CPC .... G06F 3/0386; G06F 3/0383; G06F 3/0425; G06F 3/03542; H04N 9/3194; G02B 27/20
See application file for complete search history.

(56) References Cited

U.S. PATENT DOCUMENTS

| | | | |
|---|---|---|---|
| 8,692,212 B1* | 4/2014 | Craft | G06F 3/0317 250/458.1 |
| 2006/0001654 A1* | 1/2006 | Smits | G06F 3/04883 345/176 |
| 2014/0285475 A1* | 9/2014 | Ogata | G01B 11/26 345/175 |
| 2014/0333590 A1* | 11/2014 | Hirata | G06F 3/0383 345/179 |
| 2015/0177910 A1 | 6/2015 | Shimura | |
| 2015/0205345 A1* | 7/2015 | Naess | G06F 3/0304 345/156 |
| 2017/0083120 A1* | 3/2017 | Huang | G06F 3/03545 |
| 2017/0131798 A1* | 5/2017 | Geaghan | G06F 3/044 |
| 2017/0308186 A1* | 10/2017 | Yamamoto | G06F 3/038 |

(Continued)

FOREIGN PATENT DOCUMENTS

| | | |
|---|---|---|
| JP | S62-092019 A | 4/1987 |
| JP | 2002-229726 A | 8/2002 |

(Continued)

*Primary Examiner* — Carolyn R Edwards
(74) *Attorney, Agent, or Firm* — Oliff PLC

(57) ABSTRACT

A pointing element used for an operation on a screen includes: a tip light emitting unit; and a control unit which causes the tip light emitting unit to emit light and thus transmits signal light. The control unit causes the tip light emitting unit to emit light in a first light emitting mode in a state of being in contact with the screen. The control unit causes the tip light emitting unit to emit light in a second light emitting mode having a smaller amount of light than the first light emitting mode, in a state of being not in contact with the screen.

20 Claims, 10 Drawing Sheets

(56) References Cited

U.S. PATENT DOCUMENTS

2018/0074654 A1* 3/2018 Tanaka ................ G06F 3/03542
2018/0275819 A1* 9/2018 Oshima ................ G06F 3/0488

FOREIGN PATENT DOCUMENTS

| JP | 2005-165831 A | 6/2005 |
|----|---------------|--------|
| JP | 2015-121986 A | 7/2015 |
| JP | 2015-138299 A | 7/2015 |

* cited by examiner

OPERATION DEVICE, POSITION DETECTION SYSTEM, AND METHOD FOR CONTROLLING OPERATION DEVICE

The present application is based on, and claims priority from JP Application Serial Number 2018-091409, filed May 10, 2018, the disclosure of which is hereby incorporated by reference herein in its entirety.

BACKGROUND

1. Technical Field

The present disclosure relates to an operation device, a position detection system, and a method for controlling an operation device.

2. Related Art

According to the related art, an operation device used for an operation on an operation surface is known. JP-A-2005-165831 is an example of the related art.

JP-A-2005-165831 discloses a dedicated light pen (pointing member) having a switch unit to determine whether a tip part has touched a coordinate input surface or not.

The operation device needs to communicate to collaborate with another device and is therefore very power-consuming. Thus, reducing the power consumption and increasing the service life of the operation device is demanded.

SUMMARY

An advantage of some aspects of the present disclosure is to restrain a drop in the operation detection accuracy and also reduce power consumption.

An aspect of the present disclosure is directed to an operation device used for an operation on an operation surface and including: a light emitting unit; and a control unit which causes the light emitting unit to emit light and thus transmits signal light. The control unit causes the light emitting unit to emit light in a first light emitting mode in a state of being in contact with the operation surface. The control unit causes the light emitting unit to emit light in a second light emitting mode having a smaller amount of light than the first light emitting mode, in a state of being not in contact with the operation surface.

In this configuration, the light emitting unit emits light in the second light emitting mode having a smaller amount of light than the first light emitting mode, in the state of being not in contact with the operation surface. This can restrain a drop in the operation detection accuracy and can also reduce power consumption.

In the operation device, the control unit may cause the light emitting unit to emit light cyclically in the first and second light emitting modes. The second light emitting mode may be a mode in which the light emitting unit emits light a smaller number of times per cycle than in the first light emitting mode.

This configuration can reduce power consumption.

In the operation device, the control unit may cause the light emitting unit to emit light in a plurality of light emitting periods in one cycle, in the first light emitting mode, and may cause the light emitting unit not to emit light at least in one of the plurality of light emitting periods included in one cycle of the first light emitting mode, in the second light emitting mode.

In this configuration, in the second light emitting mode, the light emitting unit does not emit light at least in one of a plurality of light emitting periods included in one cycle of the first light emitting mode. This can restrain a drop in the operation detection accuracy and can also reduce power consumption.

In the operation device, the first light emitting mode and the second light emitting mode may include a signal light emitting period during which light is emitted for optical signal transmission and a plurality of position detection light emitting periods during which light is emitted for position detection, as a plurality of the light emitting periods in one cycle. In the second light emitting mode, the light emitting unit may not emit light in one of the plurality of position detection light emitting periods included in one cycle of the first light emitting mode.

In this configuration, the second light emitting mode is a mode in which the light emitting unit does not emit light in one of a plurality of position detection light emitting periods included in one cycle of the first light emitting mode. This can restrain a drop in the operation detection accuracy and can also reduce power consumption.

The operation device may further include a detection unit which detects the state of being in contact with the operation surface. The control unit may cause the light emitting unit to emit light in the first light emitting mode in a state where contact with the operation surface is detected by the detection unit. The control unit may cause the light emitting unit to emit light in the second light emitting mode in a state where contact with the operation surface is not detected by the detection unit.

This configuration enables the light emitting unit to emit light in the first light emitting mode or the second light emitting mode, based on whether contact with the operation surface is detected by the detection unit or not.

Another aspect of the present disclosure is directed to a position detection system including an operation device used for an operation on an operation surface, and a detection device which detects an operation with the operation device. The operation device includes a light emitting unit, and a control unit which causes the light emitting unit to emit light and thus transmits signal light. The control unit causes the light emitting unit to emit light in a first light emitting mode in a state of being in contact with the operation surface. The control unit causes the light emitting unit to emit light in a second light emitting mode having a smaller amount of light than the first light emitting mode, in a state of being not in contact with the operation surface. The detection device includes a light detection unit which detects light emitted from the operation device, and a detection control unit which detects an operation with the operation device on the operation surface, based on a detection state of the light detection unit.

In this configuration, the light emitting unit emits light in the second light emitting mode having a smaller amount of light than the first light emitting mode, in the state of being not in contact with the operation surface. This can restrain a drop in the operation detection accuracy and can also reduce power consumption.

Still another aspect of the present disclosure is directed to a method for controlling an operation device having a light emitting unit and used for an operation on an operation surface and including: causing the light emitting unit to emit light and thus transmitting signal light; causing the light emitting unit to emit light in a first light emitting mode in a state of being in contact with the operation surface; and causing the light emitting unit to emit light in a second light emitting mode having a smaller amount of light than the first light emitting mode, in a state of being not in contact with the operation surface.

In this configuration, the light emitting unit emits light in the second light emitting mode having a smaller amount of light than the first light emitting mode, in the state of being not in contact with the operation surface. This can restrain a drop in the operation detection accuracy and can also reduce power consumption.

DESCRIPTION OF EXEMPLARY EMBODIMENTS

Configuration of Position Detection System

Figure 1:
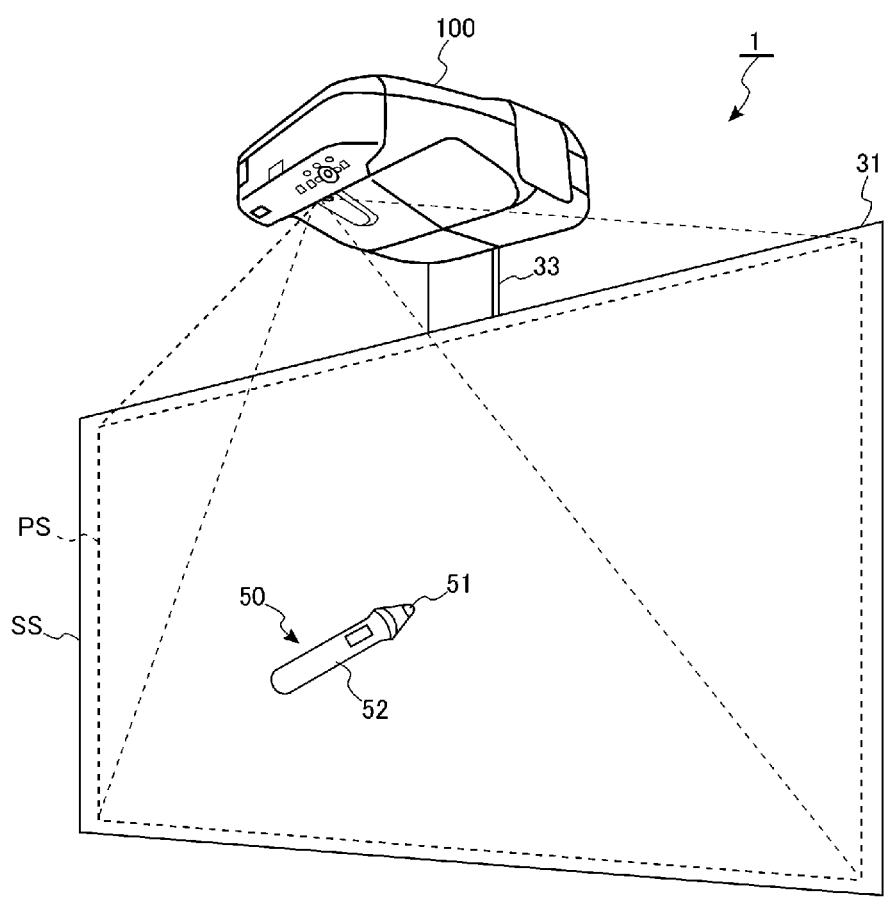
FIG. 1 is a perspective view showing the configuration of a position detection system.

An embodiment of the present disclosure will now be described with reference to the accompanying drawings. FIG. 1 is a perspective view showing the configuration of a position detection system 1. The position detection system 1 in this embodiment has a pointing element 50 operating as an operation device, and a projector 100 operating as a detection device.

The pointing element 50 is a pen-type pointing element which a user holds in a hand for use. The pointing element 50 has a tip part 51 configured to emit light, a shaft part 52 to be held by the user, and the like. The tip part 51 is equipped with a light source such as an LED which emits near-infrared light. The pointing element 50 emits light at a predetermined light emission interval in a state where the tip part 51 is in contact with an operation surface (touching state). The pointing element 50 also emits light at a predetermined light emission interval in a state where the tip part 51 is not in contact with the operation surface (hovering state). While FIG. 1 shows one pointing element 50, the number of pointing elements 50 that can be used simultaneously is not limited to one. A plurality of pointing elements 50 can be used simultaneously.

The projector 100 is a so-called short-throw projector. The projector 100 is fixed to a front and above position from a screen board 31 by a support member 33. A screen SS is formed on the screen board 31. The screen SS is formed on a front surface of the screen board 31. The front surface of the screen board 31 is a surface on the side where an image is projected by the projector 100. While FIG. 1 shows the case where the screen SS is arranged vertically, the screen SS may be arranged horizontally and the projector 100 may project an image onto the horizontally arranged screen SS. The screen SS may be a curtain hanging over a wall surface or may be a surface of apiece of furniture. Also, a wall surface or floor surface may be used as the screen SS. In this embodiment, the screen SS refers to a surface of a member where an image is projected.

The projector 100 projects image light onto the screen SS and thus displays an image (hereinafter referred to as projection image). The image light of the projection image is generated, for example, based on image data stored in a projection image memory 125 (see FIG. 2) of the projector 100 or image data supplied from an image supply device (not illustrated) which supplies image data. A projection screen PS is formed on the screen SS. The projection screen PS refers to an area where the projector 100 can project a projection image during normal use of the projector 100.

Figure 2:
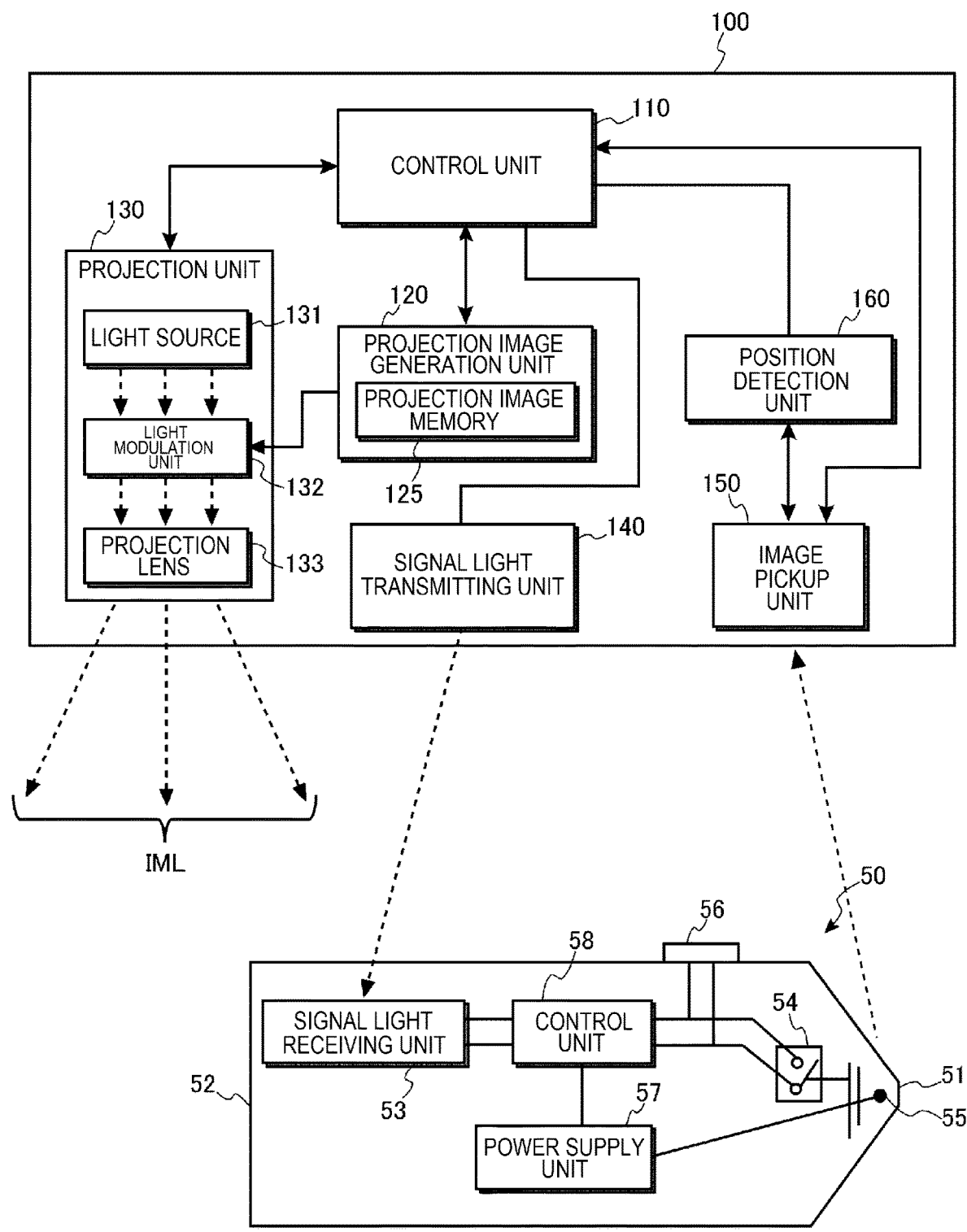
FIG. 2 shows the configuration of a projector and a pointing element.

The projector 100 also has an image pickup unit 150 (see FIG. 2). The image pickup unit 150 picks up an image over a range including at least the projection screen PS and generates picked-up image data. In this embodiment, since the projector 100 is installed obliquely above the screen SS, the image pickup unit 150 picks up an image over a range including the screen SS from obliquely above. The image pickup unit 150 is made to execute image pickup at the light emission timing of the pointing element 50. Thus, the picked-up image data includes an image of the light emitted by the pointing element 50. The projector 100 analyzes the picked-up image data and detects a pointed position of the pointing element 50. The projector 100 also performs processing corresponding to the detection of the state where the tip part 51 of the pointing element 50 is in contact with the operation surface. For example, when a drawing command with the pointing element 50 is selected, the projector 100 projects a dot, line or the like onto the screen SS, which is the operation surface which the tip part 51 of the pointing element 50 is in contact with. For example, a processing command to draw, delete, enlarge or the like is selected by an operation of the pointing element 50 pointing at a menu image displayed on the operation surface. Even in the state where the tip part 51 of the pointing element 50 is not in contact with the operation surface, the projector 100 analyzes the picked-up image data from the image pickup unit 150 and detects the position of the pointing element 50. In this embodiment, the projector 100 displays a cursor on the screen SS at a position corresponding to the pointed position in the state where the pointing element 50 is not in contact with the operation surface.

Configuration of Projector 100 and Pointing Element 50

FIG. 2 shows the configuration of the projector 100 and the pointing element 50. First, the configuration of the projector 100 will be described.

The projector 100 has a control unit 110, a projection image generation unit 120, a projection unit 130, a signal light transmitting unit 140, an image pickup unit 150, and a position detection unit 160.

The control unit 110 has a processor such as a CPU, a storage device such as a memory, and various peripheral circuits. That is, the control unit 110 has functions of a computer. The control unit 110 causes the processor to execute a program stored in the storage device and thus controls each part of the projector 100. The control unit 110 may have a plurality of processors or semiconductor chips.

The control unit 110 controls each part of the projector 100 to project a projection image onto the screen SS. The control unit 110 also detects an operation with the pointing element 50 on the screen SS, based on the result of detection by the position detection unit 160, described later. The control unit 110 also determines the content of pointing by the operation with the pointing element 50 and controls the projection image generation unit 120, based on the result of the determination. For example, the control unit 110 causes the projection image generation unit 120 to execute processing to change a projection image drawn in the projection image memory 125.

The projection image generation unit 120 has the projection image memory 125 storing a projection image. The projection image memory 125 is a so-called frame memory which stores, frame by frame, an image to be projected by the projection unit 130.

The projection image generation unit 120 draws a projection image to be projected onto the screen SS, in the projection image memory 125, based on image data. The projection image generation unit 120 outputs the image drawn in the projection image memory 125 to a light modulation unit 132, described later, and causes the projection unit 130 to project a projection image.

The projection image generation unit 120 also executes image processing on the image drawn in the projection image memory 125. For example, the projection image generation unit 120 executes processing such as geometric correction to correct a keystone distortion or the like of the projection screen PS, digital zoom to enlarge or reduce the projection screen PS, or color correction to correct the color tone or the like of the projection screen PS.

The projection unit 130 projects the image processed by the projection image generation unit 120 onto the screen SS. The projection unit 130 has a light source 131, a light modulation unit 132, and a projection lens 133.

The light source 131 has a light source such as a xenon lamp, ultra-high-pressure mercury lamp, LED (light-emitting diode), or laser diode. The light source 131 may have a reflector and an auxiliary reflector to guide the light emitted from the light source to the light modulation unit 132. The light source 131 may also have a lens group to improve optical characteristics of projection light, a polarizer, or a light adjustment element or the like which reduces the amount of light of the light emitted from the light source on a path to the light modulation unit 132 (none of which is illustrated).

The light modulation unit 132 modulates the light incident thereon from the light source 131, according to an image signal inputted from the projection image memory 125, and thus forms projection image light IML. Typically, the projection image light IML is color image light including visible light of the three colors of RGB.

The projection lens 133 is a lens group which projects the projection image light IML modulated by the light modulation unit 132 onto the screen SS and thus forms an image on the screen SS. The projection lens 133 may have a zoom mechanism to enlarge or reduce the image projected onto the screen SS or a focus adjustment mechanism to adjust the focus.

The signal light transmitting unit 140 outputs device signal light ASL, which is a signal for synchronizing the light emission timing of the pointing element 50 with the image pickup timing of the image pickup unit 150. The device signal light ASL is a near-infrared signal which the pointing element 50 can receive via a signal light receiving unit 53, described later. The signal light transmitting unit 140 periodically transmits the device signal light ASL when the projector 100 is in operation.

The device signal light ASL is, for example, a control signal which designates the timing for the pointing element 50 to transmit pointing element signal light PSL. The pointing element signal light PSL is near-infrared light having a predetermined light emitting pattern. The pointing element 50 transmits the pointing element signal light PSL, for example, synchronously with the timing when the device signal light ASL is received. Thus, the projector 100 can cause the image pickup unit 150 to execute image pickup at the timing when the pointing element 50 emits the pointing element signal light PSL. The pointing element signal light PSL is equivalent to the "signal light" according to the present disclosure.

The image pickup unit 150 operates as the "light detection unit" according to the present disclosure. The image pickup unit 150 has an image pickup element such as a CMOS or CCD which receives the near-infrared light emitted from a tip light emitting unit 55 of the pointing element 50, an optical system which forms an image on the image pickup element, an aperture stop which limits the light incident on the image pickup element, and the like (none of which is illustrated). The image pickup unit 150 picks up an image over a range including the screen SS and generates picked-up image data. The image pickup unit 150 picks up the image by receiving the pointing element signal light PSL emitted by the pointing element 50. The picked-up image data generated by the image pickup unit 150 is outputted to the position detection unit 160. The state where an image of the pointing element signal light PSL is included in the picked-up image data is equivalent to the "detection state" according to the disclosure.

The position detection unit 160 operates as the "detection control unit" according to the present disclosure. The position detection unit 160 detects the pointing element signal light PSL from the picked-up image data generated by the image pickup unit 150. The position detection unit 160 specifies a pointed position of the pointing element 50 in the picked-up image data, based on the detected image of the pointing element signal light PSL.

The control unit 110 converts the pointed position on the picked-up image data detected by the position detection unit 160 into a position (coordinates) on the projection image memory 125. This conversion is carried out, for example, based on calibration data generated by calibration carried out before the projection of the image. The control unit 110 controls the projection image generation unit 120 to load the image data at the converted position (coordinates) on the projection image memory 125. Thus, a letter or geometric figure corresponding to the movement of the pointing element 50 on the screen SS is drawn on the screen SS.

Next, the configuration of the pointing element 50 will be described.

The pointing element 50 has a tip part 51, a shaft part 52, a signal light receiving unit 53, a tip switch 54, a tip light emitting unit 55, a button switch 56, a power supply unit 57, and a control unit 58.

The signal light receiving unit 53 receives the device signal light ASL transmitted from the projector 100. The signal light receiving unit 53 outputs a control signal indicating the timing when the device signal light ASL is received, data resulting from decoding the device signal light ASL, or the like, to the control unit 58.

The tip switch 54 is a switch which turns on when the tip part 51 is pressed in contact with the screen SS and which turns off when the tip part 51 is released from the screen SS. The tip switch 54 is equivalent to the "detection unit" according to the present disclosure.

The tip light emitting unit 55 includes an LED (light emitting diode) which emits near-infrared light. Whether the tip light emitting unit 55 emits light or not (lighting state) is controlled by the control unit 58. The pointing element signal light PSL, which is near-infrared light, is outputted from the tip light emitting unit 55. The tip light emitting unit 55 is equivalent to the "light emitting unit" according to the present disclosure.

The button switch 56 is a switch provided on the shaft part 52 of the pointing element 50 and has the same function as the tip switch 54. That is, the button switch 56 may be turned on instead of turning on the tip switch 54.

The power supply unit 57 has a battery such as a primary battery, secondary battery or photovoltaic battery, and supplies electric power to each part of the pointing element 50. The pointing element 50 may have a power switch to turn on and off the supply of electric power.

The control unit 58 has a processor such as a CPU (central processing unit), a storage device such as a memory, and various peripheral circuits. That is, the control unit 58 has functions of a computer. The control unit 58 causes the processor to execute a program stored in the storage device and thus controls each part of the pointing element 50. The control unit 58 may have a plurality of processors or semiconductor chips.

The control unit 58 decides a light emission timing for the tip light emitting unit 55 to emit light, based on the control signal inputted from the signal light receiving unit 53. The control unit 58 causes the tip light emitting unit 55 to emit light and output the pointing element signal light PSL at the decided light emission timing.

Figure 3:
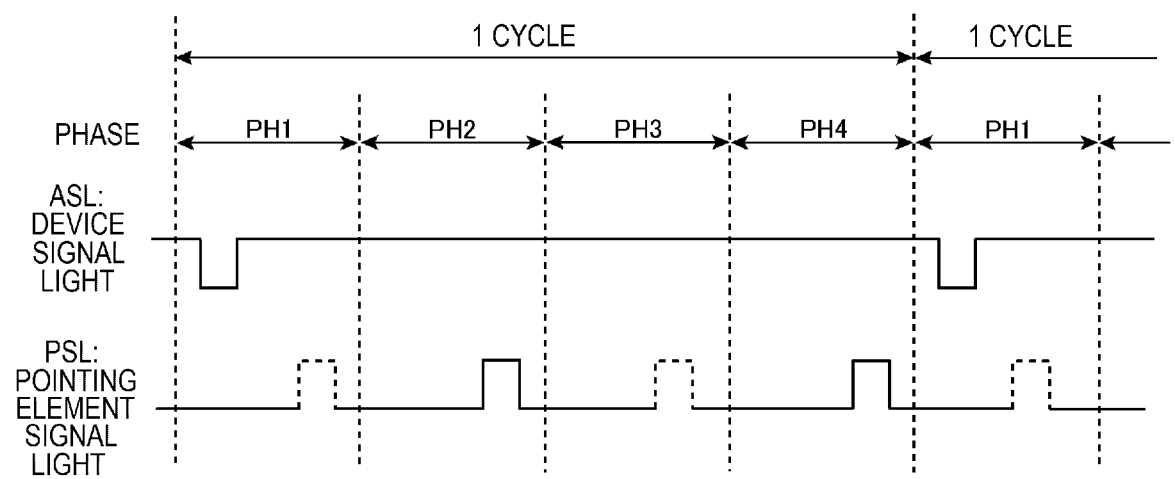
FIG. 3 shows a light emission sequence of the projector and the pointing element in a first light emitting mode.

FIG. 3 is a timing chart showing the light emission timing of the device signal light ASL and the pointing element signal light PSL.

A method for synchronizing the light emission timing of the pointing element 50 with the image pickup timing of the image pickup unit 150 will now be described with reference to the light emission timing of the device signal light ASL and the pointing element signal light PSL shown in FIG. 3.

The projector 100 repeatedly executes the four phases of first phase PH1, second phase PH2, third phase PH3, and fourth phase PH4 in this order. The projector 100 repeats these four phases as one cycle and thus specifies the position of the pointing element 50 and detects the operation with the pointing element 50. The first phase PH1, the second phase PH2, the third phase PH3, and the fourth phase PH4 are equivalent to the "light emitting period" according to the present disclosure. In this embodiment, the control unit 58 of the pointing element 50 causes the tip light emitting unit 55 to emit light and output the pointing element signal light PSL at a predetermined light emission timing and for a predetermined duration as shown in FIG. 3, in the "light emitting period".

The first phase PH1 is a phase for synchronization. In the first phase PH1, the projector 100 transmits the device signal light ASL, which is a synchronization signal. The interval of the first phase PH1 to the fourth phase PH4 is set in advance. The pointing element 50 receives the device signal light ASL and thus specifies the start timing of each of the first to fourth phases PH1 to PH4.

When the button switch 56 of the pointing element 50 is pressed by the user, the pointing element signal light PSL is transmitted from the pointing element 50 in the first phase PH1. In FIG. 3, the waveform of the pointing element signal light PSL indicated by a dashed line in the first phase PH1 represents the waveform of the pointing element signal light PSL transmitted when the button switch 56 is pressed. In the first phase PH1, the timing when the projector 100 transmits the device signal light ASL and the timing when the pointing element 50 transmits the pointing element signal light PSL do not overlap each other.

The second phase PH2 and the fourth phase PH4 are phases for position detection. In the second phase PH2 and the fourth phase PH4, the pointing element 50 transmits the pointing element signal light PSL. The projector 100 causes the image pickup unit 150 to execute image pickup and pick up an image of the pointing element signal light PSL at the light emission timing of the pointing element 50 in the second phase PH2 and the fourth phase PH4. Thus, the projector 100 detects the position of the pointing element 50. The second phase PH2 and the fourth phase PH4 are equivalent to the "position detection light emitting period" according to the present disclosure.

The third phase PH3 is a phase to notify the projector 100 whether the tip switch 54 is on or not. The pointing element 50 switches light emitting patterns in the third phase PH3, based on whether the tip switch 54 is on or off. The projector 100 causes the image pickup unit 150 to pick up an image of the pointing element signal light PSL at the light emission timing of the pointing element 50 in the third phase PH3. The projector 100 then detects the touching state where the tip part 51 of the pointing element 50 is in contact with the screen SS, based on the light emitting pattern executed when the tip switch 54 is on, and the hovering state where the tip part 51 of the pointing element 50 is not in contact with the screen SS, based on the light emitting pattern executed when the tip switch 54 is off.

The third phase PH3 is also a phase for determination of the pointing element. In the third phase PH3, the pointing element 50 emits light in a preset light emitting pattern.

When an operation is carried out with a plurality of pointing elements 50, the respective pointing elements 50 emit light in different light emitting patterns from each other in the third phase. For example, the case where an operation is carried out with two pointing elements 50, that is, a pointing element 50A and a pointing element 50B (neither of which is illustrated), will now be described. It is assumed that "100" is set as the light emitting pattern of the pointing element 50A in the third phase and that "010" is set as the light emitting pattern of the pointing element 50B in the third phase. The pointing elements 50A and 50B cause the tip light emitting unit 55 to emit light in the third phase PH3 in a cycle corresponding to "1" of three successive cycles, and cause the tip light emitting unit 55 not to emit light in the third phase PH3 in a cycle corresponding to "0". The pointing element 50A, for which the light emitting pattern "100" is set, emits light in the third phase PH3 in the first cycle of three successive cycles and does not emit light in the third phase PH3 in the second and third cycles. One cycle is a set of the first to fourth phases PH1 to PH4. Meanwhile, the pointing element 50B, for which the light emitting pattern "010" is set, does not emit light in the third phase PH3 in the first cycle, emits light in the third phase PH3 in the second cycle, and does not emit light in the third phase PH3 in the third cycle. The projector 100 detects the light emitting state of the pointing element 50A and the pointing element 50B in the third phase PH3 in three successive cycles and thus distinguishes the pointing element 50A and the pointing element 50B from each other.

Figure 4:
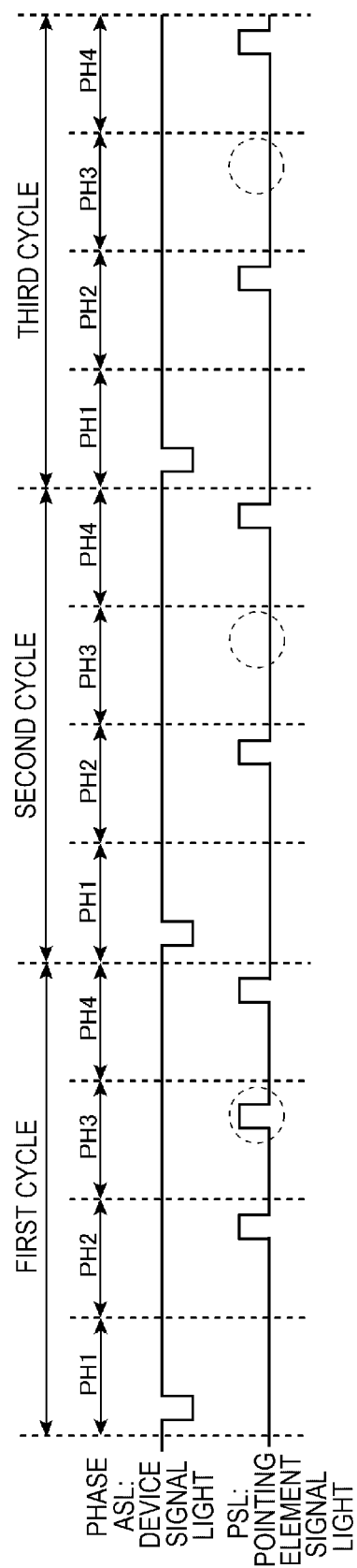
FIG. 4 shows a light emission sequence of the pointing element in three successive cycles.
Figure 5:
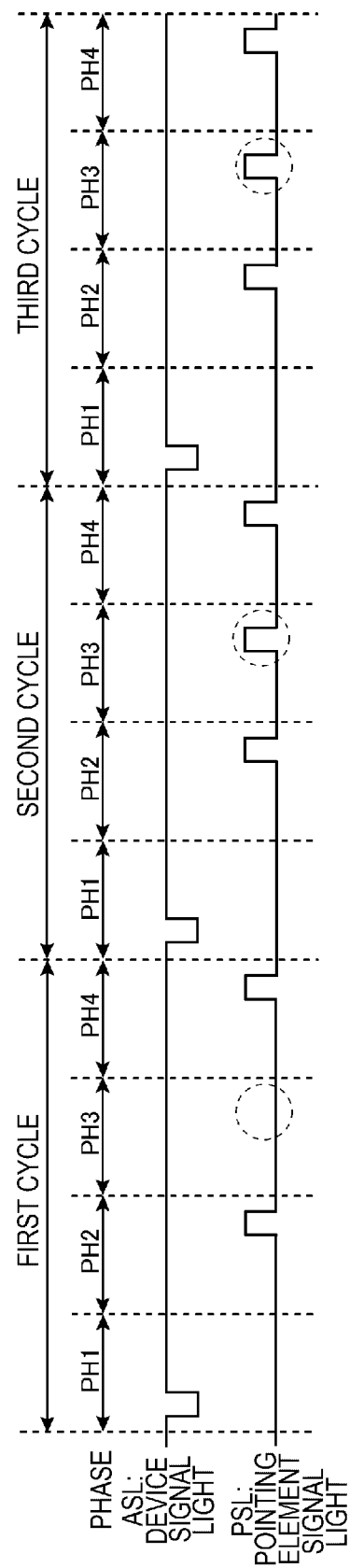
FIG. 5 shows a light emission sequence of the pointing element in three successive cycles.

FIGS. 4 and 5 show a light emitting pattern of the pointing element 50 in three successive cycles, that is, a first cycle, a second cycle, and a third cycle. Particularly FIG. 4 shows a light emitting pattern employed when the tip part 51 of the pointing element 50 is in contact with the screen SS, with the tip switch 54 being on. FIG. 5 shows a light emitting pattern employed when the tip part 51 of the pointing element 50 is not in contact with the screen SS, with the tip switch 54 being off.

It is assumed, for example, that "100" is set as the light emitting pattern in the third phase of the pointing element 50. When the tip switch 54 is on, the pointing element 50 emits light in the third phase PH3 in the first cycle and does not emit light in the third phase PH3 in the second cycle and the third cycle, as shown in FIG. 4. Meanwhile, when the tip switch 54 is off, the pointing element 50 does not emit light in the third phase PH3 in the first cycle and emits light in the third phase PH3 in the second cycle and the third cycle, as shown in FIG. 5.

The projector 100 detects the light emitting state in the third phase PH3 and thus can detect whether the tip switch 54 of the pointing element 50 is off or on. The third phase PH3 is equivalent to the "signal light emitting period" according to the present disclosure.

In this embodiment, the pointing element 50 has a first light emitting mode and a second light emitting mode, as light emitting modes in which the pointing element 50 causes the tip light emitting unit 55 to emit light. The first light emitting mode is a light emitting mode in which the pointing element 50 emits light without reducing the amount of light emitted. The second light emitting mode is a light emitting mode in which the amount of light emitted from the tip light emitting unit 55 is smaller than in the first light emitting mode. The first light emitting mode is the light emitting mode of the pointing element 50 in the touching state, where the tip part 51 of the pointing element 50 is in contact with the screen SS. The second light emitting mode is the light emitting mode of the pointing element 50 in the hovering state, where the tip part 51 of the pointing element 50 is not in contact with the screen SS.

Figure 6:
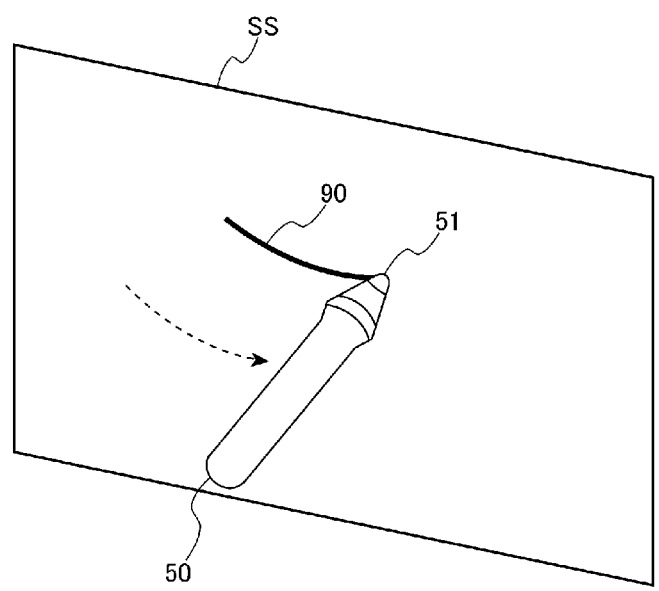
FIG. 6 schematically shows drawing in a touching state.
Figure 7:
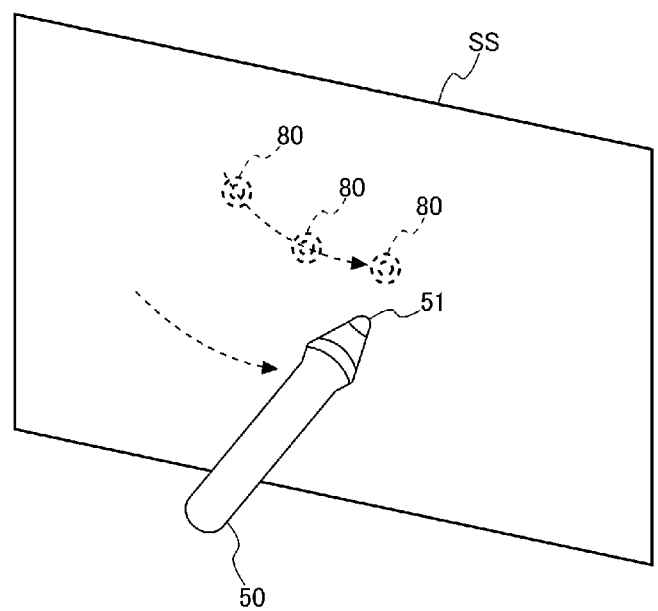
FIG. 7 schematically shows a movement of a cursor in a hovering state.

FIG. 6 shows the state of the screen SS corresponding to the touching state, where the tip part 51 of the pointing element 50 is in contact with the screen SS. FIG. 7 shows the state of the screen SS corresponding to the hovering state, where the tip part 51 of the pointing element 50 is not in contact with the screen SS.

It is assumed, for example, that a drawing command is selected and that the pointing element 50 is moved on the screen SS in the state where the tip part 51 of the pointing element 50 is in contact with the screen SS. In this case, the pointing element 50 emits light in the first light emitting mode. The projector 100 detects a pointed position of the pointing element 50, based on picked-up image data from the image pickup unit 150, and draws an image at a position on the screen SS corresponding to the detected pointed position. FIG. 6 shows a curve 90 being drawn on the screen SS in response to a movement of the tip part 51.

It is now assumed that the pointing element 50 is moved in the hovering state, where the tip part 51 of the pointing element 50 is not in contact with the screen SS. The pointing element 50 causes the tip light emitting unit 55 to emit light also in the hovering state, where the tip part 51 is not in contact with the screen SS. In the hovering state, the pointing element 50 emits light in the second light emitting mode. The projector 100 detects the tip part 51 of the pointing element 50, based on picked-up image data from the image pickup unit 150, and displays a cursor 80 at a position on the screen SS corresponding to the position of the tip part 51 thus detected. FIG. 7 shows the way the position of the cursor 80 changes in response to a movement of the pointing element 50. In FIG. 7, the cursor 80 is shown as a double circle. The trajectory of the cursor 80 is not left displayed. Only the cursor 80 as a double circle corresponding to the final pointed position is displayed.

Next, a method for reducing the amount of light emitted from the pointing element 50 in the second light emitting mode will be described.

In the first light emitting mode, the pointing element 50 causes the tip light emitting unit 55 to emit light in the second phase PH2 and the fourth phase PH4, and notifies the projector 100 of its position. Meanwhile, in the second light emitting mode, the pointing element 50 emits light and notifies the projector 100 of the position of the pointing element 50 a smaller number of times than in the first light emitting mode. Specifically, when in the second light emitting mode, the pointing element 50 causes the tip light emitting unit 55 not to emit light at least in one of the second phase PH2 and the fourth phase PH4.

Figure 8:
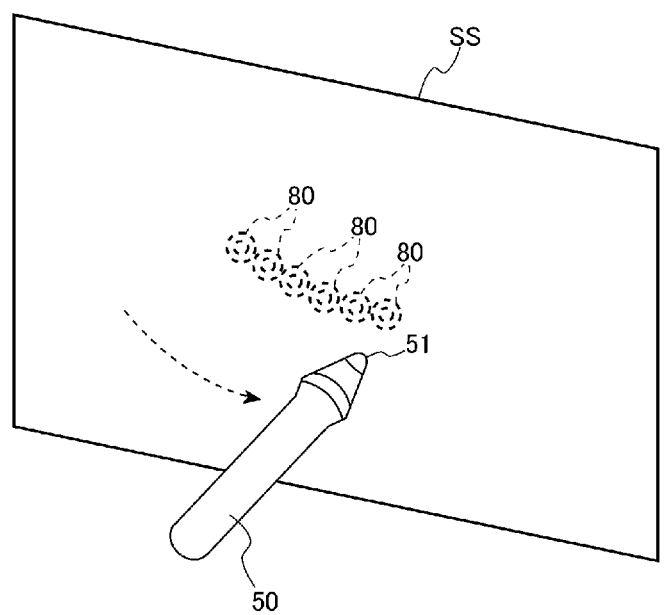
FIG. 8 shows a comparative example of the movement of the cursor in the hovering state.

FIG. 8 shows a comparative example of the movement of the cursor in the hovering state. Specifically, FIG. 8 shows a movement (trajectory) of the cursor 80 when the pointing element 50 emits light in the second phase PH2 and the fourth phase PH2 in the hovering state.

As can be seen in the comparison between FIGS. 7 and 8, causing the pointing element 50 to emit light both in the second phase PH2 and in the fourth phase PH4 enables a smoother movement of the cursor 80 with the movement of the pointing element 50. When the pointing element 50 emits light both in the second phase PH2 and in the fourth phase PH4, the position of the cursor 80 is updated at 57 Hz. In contrast, when the pointing element 50 does not emit light in one of the second phase PH2 and the fourth phase PH4, the frequency of updating the position of the cursor 80 drops to 28.5 Hz. However, in the hovering state, the position of the cursor 80 is simply changed with the movement of the pointing element 50 and no letter or geometric figure is drawn on the screen SS in response to the movement of the pointing element 50. Therefore, there is no problem with an operation using the pointing element 50. Thus, in this embodiment, when the light emitting mode is the second light emitting mode, the pointing element 50 does not emit light in the second phase PH2 or the fourth phase PH4.

Figure 9:
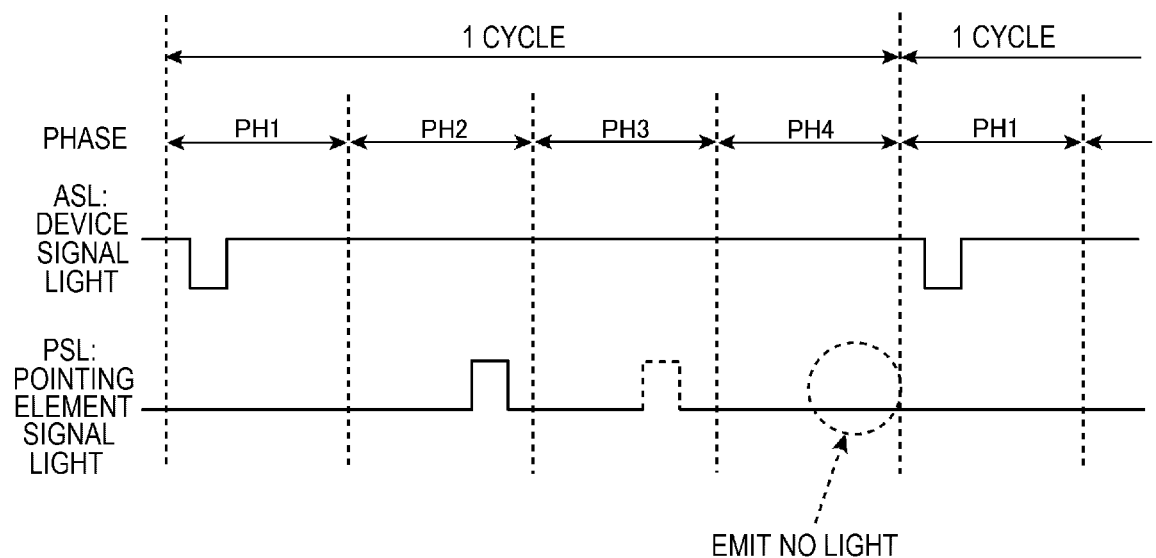
FIG. 9 shows a light emission sequence of the projector and the pointing element in a second light emitting mode.

FIG. 9 shows a light emission sequence of the pointing element 50 when the pointing element 50 is in the second light emitting mode.

When the light emitting mode of the pointing element 50 in this embodiment is the second light emitting mode, the pointing element 50 causes the tip light emitting unit 55 not to emit light in the fourth phase PH4, as shown in FIG. 9. That is, the number of times the tip light emitting unit 55 emits light when the pointing element 50 is in the second light emitting mode is smaller than the number of times the tip light emitting unit 55 emits light when the pointing element 50 is in the first light emitting mode. This can substantially halve the amount of light emitted from the LED in the hovering state and can reduce the power consumption of the pointing element 50. That is, the amount of light emitted from the tip light emitting unit 55 in the second light emitting mode can be made smaller than the amount of light emitted from the tip light emitting unit 55 in the first light emitting mode. Although FIG. 9 shows the case where the tip light emitting unit 55 does not emit light in the fourth phase PH4, the tip light emitting unit 55 may not emit light in the second phase PH2 and may emit light in the fourth phase PH4. Also, the tip light emitting unit 55 may not emit light in the second phase PH2 and the fourth phase PH4.

Operation Flow of Pointing Element

Figure 10:
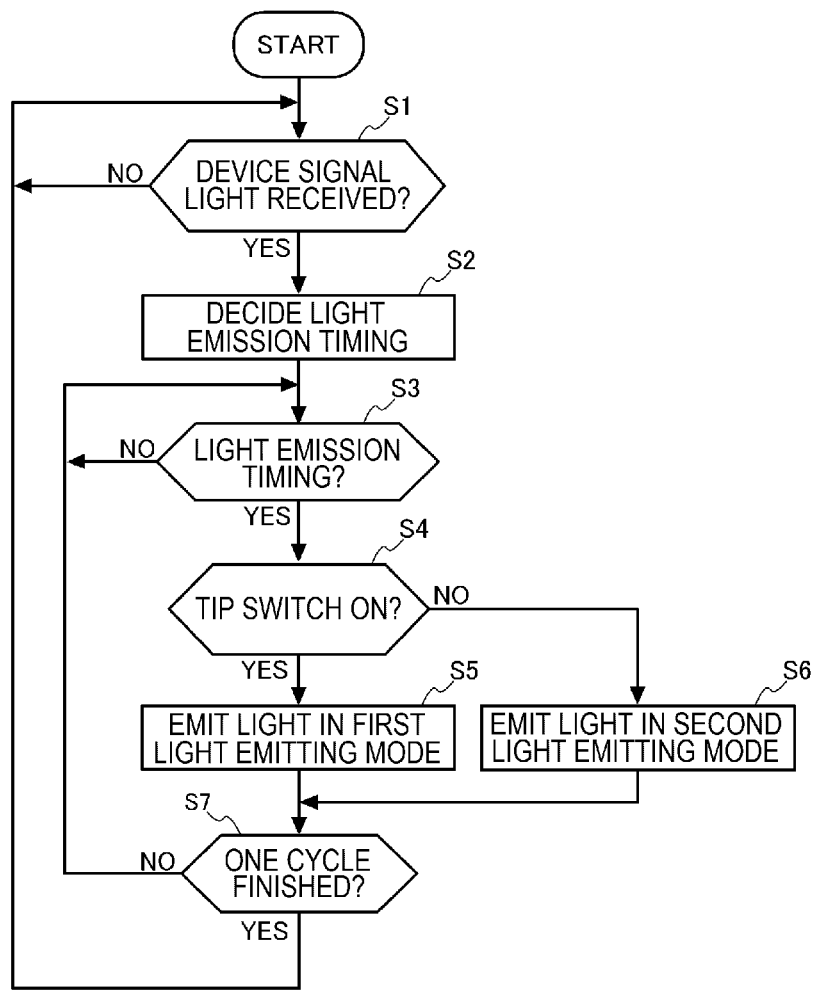
FIG. 10 is a flowchart showing operations of the pointing element.

FIG. 10 is a flowchart showing operations of the pointing element 50.

First, the control unit 58 determines whether the device signal light ASL, which is a near-infrared signal for synchronization, is received from the projector 100 or not (step S1). For example, the control unit 58 can determine that the device signal light ASL is received, by receiving a control signal indicating the timing when the device signal light ASL is received or data resulting from decoding the device signal light ASL, inputted from the signal light receiving unit 53. When the device signal light ASL is not received (NO in step S1), the control unit 58 waits until the device signal light ASL is received from the projector 100 (step S1).

When the device signal light ASL is received (YES in step S1), the control unit 58 decides a light emission timing for each of the second phase PH2, the third phase PH3, and the fourth phase PH4, based on the control signal inputted from the signal light receiving unit 53 (step S2). In the description of this flowchart, it is assumed that the button switch 56 is not pressed and that the pointing element 50 does not emit light in the first phase PH1.

Next, the control unit 58 determines whether the light emission timing decided in step S2 has come or not (step S3). When it is not the light emission timing (NO in step S3), the control unit 58 waits until the light emission timing comes. When the light emission timing has come (YES in step S3), the control unit 58 determines whether the tip switch 54 is on or not (step S4).

When the tip switch 54 is on (YES in step S4), the control unit 58 transmits the pointing element signal light PSL in the first light emitting mode (step S5). Subsequently, the control unit 58 determines whether one cycle is finished or not (step S7). When one cycle is not finished (NO in step S7), the control unit 58 returns to step S3 and determines again whether the light emission timing has come or not (step S3). When one cycle is finished (YES in step S7), the control unit 58 returns to step S1 and waits to receive the device signal light ASL transmitted from the projector 100.

Meanwhile, when the tip switch 54 is off (NO in step S4), the control unit 58 transmits the pointing element signal light PSL in the second light emitting mode (step S6). Subsequently, the control unit 58 determines whether one cycle is finished or not (step S7). When one cycle is not finished (NO in step S7), the control unit 58 returns to step S3 and determines whether the light emission timing has come or not (step S3). When one cycle is finished (YES in step S7), the control unit 58 waits until the device signal light ASL transmitted from the projector 100 is received (step S1).

The second light emitting mode is a light emitting mode in which the light emission by the pointing element 50 in the position detection phase is restrained so as to reduce the power consumption of the pointing element 50. The second light emitting mode can also be said to be a light emitting mode in the state where the position detection accuracy for the pointing element 50 not is required. In the second light emitting mode, lower power consumption is prioritized and the pointing element 50 does not emit light in at least one of the second phase PH2 and the fourth phase PH4, which are position detection phases. Meanwhile, in the first light emitting mode, the position detection accuracy is prioritized and the pointing element 50 emits light both in the second phase PH2 and the in the fourth phase PH4, which are position detection phases. The switching between the first light emitting mode and the second light emitting mode may be set at the startup of the pointing element 50 or may correspond to the tip switch 54 turning on and off.

As described above, the pointing element 50 in this embodiment is an operation device used for an operation on the screen SS, which is an operation surface. The pointing element 50 has the tip light emitting unit 55 functioning as a light emitting unit, and the control unit 58 causing the tip light emitting unit 55 to emit light and thus transmitting signal light. The control unit 58 causes the tip light emitting unit 55 to emit light in the first light emitting mode, in the state of being in contact with the screen SS, and causes the tip light emitting unit 55 to emit light in the second light emitting mode having a smaller amount of light than the first light emitting mode, in the state of being not in contact with the screen SS.

Thus, in the state where the pointing element 50 is not in contact with the screen SS, the tip light emitting unit 55 emits light in the second light emitting mode having a smaller amount of light than the first light emitting mode. This can restrain a drop in the operation detection accuracy and can also reduce power consumption.

The control unit 58 causes the tip light emitting unit 55 to cyclically emit light in the first and second light emitting modes. The second light emitting mode is a mode in which the number of times the tip light emitting unit 55 emits light per cycle is smaller than in the first light emitting mode.

Therefore, when the pointing element 50 is not in contact with the screen SS, the number of times the tip light emitting unit 55 emits light per cycle can be made smaller than when the pointing element 50 is in contact with the screen SS. This can restrain a drop in the operation detection accuracy and can also reduce power consumption.

In the first light emitting mode, the control unit 58 causes the tip light emitting unit 55 to emit light in a plurality of light emitting periods in one cycle. In the second light emitting mode, the control unit 58 causes the tip light emitting unit 55 to emit light in at least one of a plurality of light emitting periods included in one cycle of the first light emitting mode.

This can restrain a drop in the operation detection accuracy and can also reduce power consumption.

The first light emitting mode and the second light emitting mode include, in one cycle, the third phase PH3 to carry out light emission for optical signal transmission, and the second phase PH2 and the fourth phase PH4 to carry out light emission for position detection. In the second light emitting mode, the control unit 58 causes the tip light emitting unit 55 not to emit light in one of the second phase PH2 and the fourth phase PH4 included in one cycle of the first light emitting mode.

This can restrain a drop in the operation detection accuracy and can also reduce power consumption.

The pointing element 50 has the tip switch 54 operating as a detection unit which detects contact with the screen SS. In the state where contact with the screen SS is detected by the tip switch 54, the control unit 58 causes the tip light emitting unit 55 to emit light in the first light emitting mode. In the state where contact with the screen SS is not detected by the detection unit, the control unit 58 causes the tip light emitting unit 55 to emit light in the second light emitting mode.

This enables the tip light emitting unit 55 to emit light in the first light emitting mode or the second light emitting mode, based on whether contact of the pointing element 50 with the screen SS is detected by the position detection unit 160 or not.

Modification Example

In the embodiment, the first light emitting mode is described as the light emitting mode of the pointing element 50 in the touching state, where the tip part 51 of the pointing element 50 is in contact with the screen SS, and the second light emitting mode is described as the light emitting mode of the pointing element 50 in the hovering state, where the tip part 51 of the pointing element 50 is not in contact with the screen SS. As a modification example, the first light emitting mode may be a normal light emitting mode in which the power consumption of the pointing element 50 is not reduced, and the second light emitting mode may be a light emitting mode in which the power consumption of the pointing element 50 is reduced.

In the modification example, when the light emitting mode is the first light emitting mode, the pointing element 50 causes the tip light emitting unit 55 to emit light in the second phase PH2 and the fourth phase PH4 whether it is in the touching state or in the hovering state. When the light emitting mode is the second light emitting mode, the pointing element 50 in the touching state causes the tip light emitting unit 55 to emit light in the second phase PH2 and the fourth phase PH4. Meanwhile, the pointing element 50 in the hovering state causes the tip light emitting unit 55 not to emit light in one of the second phase PH2 and the fourth phase PH4.

In the embodiment, the switching between the first light emitting mode and the second light emitting mode is carried out, corresponding to the tip switch 54 turning on and off. In this modification example, for example, another switch that is different from the tip switch 54 may be provided on the pointing element 50, and the user may operate this switch to switch between the first light emitting mode and the second light emitting mode. This switch is turned on and off regardless of whether the tip part 51 is in contact with the screen SS or not, as with the tip switch 54. An operation unit (not illustrated) of the projector 100 may accept a setting of the light emitting mode of the pointing element 50, and the signal light transmitting unit 140 may transmit a signal to switch the pointing element 50 to the first light emitting mode or the second light emitting mode according to the setting accepted by the projector 100.

The foregoing embodiment is a suitable embodiment of the present disclosure. However, the present disclosure is not limited to this embodiment and can be carried out with various modifications without departing from the scope and spirit of the present disclosure.

For example, while the projector 100 in the embodiment is described as a liquid crystal projector using a transmission-type liquid crystal panel, a projector using a reflection-type liquid crystal panel or a digital mirror device may be employed.

Each functional unit of the pointing element 50 shown in FIG. 2 represents a functional configuration implemented by a collaboration of hardware and software and is not particularly limited to any specific installation form. Therefore, there is no need to install pieces of hardware corresponding individually to the respective functional units. A single processor may execute a program to implement functions of a plurality of functional units. Also, a part of the functions implemented by software in the embodiment may be implemented by hardware, and a part of the functions implemented by hardware may be implemented by software.

For example, in the configuration of the pointing element 50 shown in FIG. 2, the signal light receiving unit 53, the tip switch 54, the tip light emitting unit 55, and the control unit 58 may be formed by hardware. Also, at least a part of the signal light receiving unit 53, the control unit 58, the power supply unit 57, and the tip switch 54 may be formed by an integrated circuit (IC) or another digital circuit. At least apart of these units may include an analog circuit. The integrated circuit includes an LSI, ASIC (application-specific integrated circuit), and PLD. The PLD includes, for example, an FPGA. These units may be a combination of a processor and an integrated circuit. The combination is called, for example, a microcontroller (MCU), SoC (system-on-a-chip), system LSI, chip set or the like.

In the configuration of the projector 100 shown in FIG. 2, the projection image generation unit 120, the signal light transmitting unit 140, and the position detection unit 160 may be formed by hardware. Also, a part of the projection image generation unit 120, the signal light transmitting unit 140, the position detection unit 160, and the control unit 110 may be formed by an integrated circuit (IC) or another digital circuit. At least a part of these units may include an analog circuit. These units may be formed by a combination of a processor and an integrated circuit.

When the method for controlling the operation device is implemented using a computer having the operation device, the present disclosure can also be configured as a program executed by the computer to implement the control method, a recording medium on which the program is recorded in a computer-readable manner, or a transmission medium which transmits the program. As the recording medium, a magnetic or optical recording medium, or a semiconductor memory device can be used. Specifically, a portable recording medium such as a flexible disk, HDD (hard disk drive), CD-ROM (compact disk read-only memory), DVD (digital versatile disk), Blu-ray (trademark registered) disc, magneto-optical disk, flash memory, or card-type recording medium, or a fixed recording medium may be employed. The recording medium may also be a non-volatile storage device such as a RAM (random access memory), ROM (read-only memory), or HDD as an internal storage device provided in an image display device.

The processing stages in the flowchart shown in FIG. 10 are separated from each other according to the main processing content in order to facilitate understanding of the processing by the control unit 58 of the pointing element 50. However, the present disclosure is not limited by the way the processing stages in the flowchart of FIG. 10 are separated or the names of the processing stages. The processing by the control unit 58 can be divided into many more processing stages according to the processing content. Also, one processing stage can be divided to include more processing. The order of processing in the flowchart is not limited to the illustrated example, either.

What is claimed is:

1. An operation device used for an operation on an operation surface, the operation device comprising:
   a light emitting unit; and
   a control unit which causes the light emitting unit to transmit signal light by causing the light emitting unit to emit light, wherein
   the control unit
      causes the light emitting unit to emit light in a first light emitting mode when the operation device is in contact with the operation surface, and
      causes the light emitting unit to emit light in a second light emitting mode having a smaller amount of light than the first light emitting mode when the operation device is not in contact with the operation surface.

2. The operation device according to claim 1, wherein
   the control unit causes the light emitting unit to emit light cyclically in the first and second light emitting modes, and the second light emitting mode is a mode in which the light emitting unit emits light a smaller number of times per cycle than in the first light emitting mode.

3. The operation device according to claim 2, wherein the control unit causes the light emitting unit to emit light in a plurality of light emitting periods in one cycle, in the first light emitting mode, and causes the light emitting unit not to emit light at least in one of the plurality of light emitting periods included in one cycle of the first light emitting mode, in the second light emitting mode.

4. The operation device according to claim 3, wherein the first light emitting mode and the second light emitting mode include a signal light emitting period during which light is emitted for optical signal transmission and a plurality of position detection light emitting periods during which light is emitted for position detection, as a plurality of the light emitting periods in one cycle, and
in the second light emitting mode, the control unit causes the light emitting unit not to emit light in one of the plurality of position detection light emitting periods included in one cycle of the first light emitting mode.

5. The operation device according to claim 1, further comprising
a detection unit which detects the state in which the operation device is in contact with the operation surface, wherein
the control unit causes the light emitting unit to emit light in the first light emitting mode when the operation device is in contact with the operation surface is detected by the detection unit, and the control unit causes the light emitting unit to emit light in the second light emitting mode when the operation device is in contact with the operation surface is not detected by the detection unit.

6. A position detection system comprising:
an operation device used for an operation on an operation surface; and
a detection device which detects an operation with the operation device, wherein
the operation device
includes a light emitting unit that transmits signal light by emitting light,
causes the light emitting unit to emit light in a first light emitting mode when the operation device is in contact with the operation surface, and
causes the light emitting unit to emit light in a second light emitting mode having a smaller amount of light than the first light emitting mode when the operation device is not in contact with the operation surface, and
the detection device includes
a light detection unit which detects light emitted from the operation device, and
a detection control unit which detects an operation with the operation device on the operation surface, based on a detection state of the light detection unit.

7. A method for controlling an operation device includes alight emitting unit and used for an operation on an operation surface, the method comprising:
causing the light emitting unit to transmit signal light by causing the light emitting unit to emit light;
causing the light emitting unit to emit light in a first light emitting mode when the operation device is in contact with the operation surface; and
causing the light emitting unit to emit light in a second light emitting mode having a smaller amount of light than the first light emitting mode when the operation device is not in contact with the operation surface.

8. The method for controlling the operation device according to claim 7, wherein
causing the light emitting unit to emit light cyclically in the first and second light emitting modes, and
the second light emitting mode is a mode in which the light emitting unit emits light a smaller number of times per cycle than a number of times per cycle in the first light emitting mode.

9. The method for controlling the operation device according to claim 8, wherein
in the first light emitting mode, causing the light emitting unit to emit light in a plurality of light emitting periods in one cycle, and in the second light emitting mode, causing the light emitting unit not to emit light at least in one of the plurality of light emitting periods included in one cycle of the first light emitting mode.

10. The method for controlling the operation device according to claim 9, wherein
the first light emitting mode and the second light emitting mode include a signal light emitting period during which light is emitted for optical signal transmission and a plurality of position detection light emitting periods during which light is emitted for position detection, as a plurality of the light emitting periods in one cycle, and
in the second light emitting mode, causing the light emitting unit not to emit light in one of the plurality of position detection light emitting periods included in one cycle of the first light emitting mode.

11. The method for controlling the operation device according to claim 7, wherein
causing the detection unit to detect the state in which the operation device is in contact with the operation surface or the state in which the operation device is not in contact with the operation surface, and
causing the light emitting unit to emit light in the first light emitting mode when the operation device is in contact with the operation surface, and causing the light emitting unit to emit light in the second light emitting mode when the operation device is in contact with the operation surface.

12. The position detection system according to claim 6, wherein
the operation device causes the light emitting unit to emit light cyclically in the first and second light emitting modes, and
the second light emitting mode is a mode in which the light emitting unit emits light a smaller number of times per cycle than a number of times per cycle in the first light emitting mode.

13. The position detection system according to claim 12, wherein
the operation device causes the light emitting unit to emit light in a plurality of light emitting periods in one cycle, in the first light emitting mode, and causes the light emitting unit not to emit light at least in one of the plurality of light emitting periods included in one cycle of the first light emitting mode, in the second light emitting mode.

14. The position detection system according to claim 13, wherein
the first light emitting mode and the second light emitting mode include a signal light emitting period during which light is emitted for optical signal transmission and a plurality of position detection light emitting periods during which light is emitted for position detection, as a plurality of the light emitting periods in one cycle, and in the second light emitting mode, the operation device causes the light emitting unit not to emit light in one of the plurality of position detection light emitting periods included in one cycle of the first light emitting mode.

15. The position detection system according to claim 6, wherein the operation device comprises a detection unit which detects the state in which the operation device is in contact with the operation surface, and causes the light emitting unit to emit light in the first light emitting mode when the detection unit detects contact between the operation device and the operation surface, and causes the light emitting unit to emit light in the second light emitting mode in a state where contact with the operation surface is not detected by the detection unit.

16. The position detection system according to claim 6, wherein the detection device comprises a signal light transmitting unit which transmits a signal for synchronizing a light emission timing of the operation device with an image pickup timing of the light detection unit, the light detection unit detects a position of the operation device, based on light emission for position detection of the operation device synchronized with the image pickup timing, and a number of times when the position of the operation device is detected in the second light emitting mode is smaller than a number of times when the operation device is detected in the first light emitting mode.

17. The position detection system according to claim 6, wherein one cycle of light emission of the light emitting unit includes a first phase, a second phase, a third phase, and a fourth phase, the first phase is a phase for synchronization between the operation device and the detection device, the second phase and the fourth phase are phases for position detection of the operation device, and the third phase is a phase for contact detection between the operation device and the operation surface, the operation device causes the light emitting unit to carry out light emission for position detection in the second phase and the fourth phase, in the first light emitting mode, and carry out light emission for position detection in the second phase and not carry out light emission for position detection in the fourth phase, in the second light emitting mode.

18. The position detection system according to claim 17, wherein when the detection unit detects contact between the operation device and the operation surface, the operation device reports the contact by light emission of the light emitting unit in the third phase.

19. The position detection system according to claim 6, wherein the detection device causes the light detection unit to pick up an image of the operation surface and generates picked-up image data, and causes the detection control unit to detect a pointed position of the operation device, based on the picked-up image data.

20. The position detection system according to claim 6, further comprising a projection unit which displays on the operation surface an image corresponding to a movement of the operation device when the light emitting unit emits light in the first light emitting mode, and which displays on the operation surface a cursor whose position is changed in response to a movement of the operation device when the light emitting unit emits light in the second light emitting mode.

* * * * *